US009562922B2

United States Patent
Kimura et al.

(10) Patent No.: US 9,562,922 B2
(45) Date of Patent: Feb. 7, 2017

(54) LIGHT SENSOR AND ELECTRONIC DEVICE

(71) Applicant: SHARP KABUSHIKI KAISHA, Osaka-shi, Osaka (JP)

(72) Inventors: Tadamasa Kimura, Osaka (JP); Takayuki Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 66 days.

(21) Appl. No.: 14/762,120

(22) PCT Filed: Nov. 8, 2013

(86) PCT No.: PCT/JP2013/080247
§ 371 (c)(1),
(2) Date: Jul. 20, 2015

(87) PCT Pub. No.: WO2014/115397
PCT Pub. Date: Jul. 31, 2014

(65) Prior Publication Data
US 2015/0316572 A1 Nov. 5, 2015

(30) Foreign Application Priority Data
Jan. 25, 2013 (JP) .................................. 2013-012642

(51) Int. Cl.
G01P 3/36 (2006.01)
G01S 17/50 (2006.01)
G01V 8/20 (2006.01)
G01P 13/00 (2006.01)
G01S 17/58 (2006.01)
(Continued)

(52) U.S. Cl.
CPC ................ *G01P 3/36* (2013.01); *G01P 13/00* (2013.01); *G01S 17/50* (2013.01); *G01S 17/58* (2013.01); *G01V 8/20* (2013.01); *G06F 3/017* (2013.01); *G01V 8/12* (2013.01)

(58) Field of Classification Search
CPC ................ G01J 3/02; G01J 3/513; G01J 3/51; G01N 15/1459; G01N 21/65
See application file for complete search history.

(56) References Cited

U.S. PATENT DOCUMENTS

2001/0052984 A1* 12/2001 Ookubo ................. G01D 5/285
356/614
2007/0274167 A1* 11/2007 Ishikawa .............. G11B 7/0948
369/44.11
(Continued)

FOREIGN PATENT DOCUMENTS

CN 102564305 B 10/2014
JP 2000-075046 A 3/2000

*Primary Examiner* — Tarifur Chowdhury
*Assistant Examiner* — Md M Rahman
(74) *Attorney, Agent, or Firm* — Birch, Stewart, Kolasch & Birch, LLP

(57) ABSTRACT

A provision of a movement direction determination section for determining that a particular direction is a movement direction of the detection target object, in a case where a second comparator determines that larger than a predetermined threshold value is an absolute value of a ratio of (i) a difference between the photocurrent of the at least two light receiving elements to (ii) a sum of a photocurrent of at least two light receiving elements next to each other along the particular direction.

5 Claims, 9 Drawing Sheets

(51) Int. Cl.
*G06F 3/01* (2006.01)
*G01V 8/12* (2006.01)

(56) References Cited

U.S. PATENT DOCUMENTS

| | | | |
|---|---|---|---|
| 2011/0248151 A1* | 10/2011 | Holcombe | G01S 3/7803 250/221 |
| 2011/0295549 A1* | 12/2011 | Takabayashi | G01S 7/4004 702/142 |
| 2012/0097837 A1 | 4/2012 | Ohno | |
| 2012/0280904 A1 | 11/2012 | Skurnik et al. | |

* cited by examiner

301: LIGHT EMITTING ELEMENT
302,303: LIGHT RECEIVING ELEMENT
304: DETECTION TARGET OBJECT

LIGHT SENSOR AND ELECTRONIC DEVICE

TECHNICAL FIELD

The present invention relates to an optical sensor suitably used as, for example, a proximity sensor or a gesture sensor and to an electronic device including the optical sensor.

BACKGROUND ART

An optical sensor has such functions as (i) a function of detecting a detection target and (ii) a function of detecting, for example, the distance between a detection target and itself. Optical sensors are thus finding applications in an increasingly wide field.

Electronic devices such as a mobile phone (including a smartphone) and a digital camera include a liquid crystal panel for displaying an image. Some models of such electronic devices include a touch panel that allows a user to perform a touch operation on the liquid crystal panel. Further, some mobile phones include, in an audio output section to which the user brings an ear, a proximity sensor mounted for detecting an approach of a human face to the mobile phone. Such a proximity sensor is used to, for example, allow the touch panel to be turned off in a case where a human face approaches the liquid crystal panel. The proximity sensor thus serves to reduce power consumption by the mobile phone and to prevent a malfunction of the touch panel.

In a technical field of a sensor for detecting a movement of an object, there is a demand for use of an optical sensor as, other than a proximity sensor as described above, a gesture sensor for detecting a movement of a human hand. Such a gesture sensor detects a movement of a hand over the touch panel in a noncontact manner. This allows the user to operate the liquid crystal panel so as to scroll screen contents thereon without dirtying the surface of the liquid crystal panel with a wet or dirty hand. A gesture sensor further allows the user to operate the liquid crystal panel normally even in a case where the user wears a glove or the like, in which case the touch panel usually cannot detect a touch operation easily.

Patent Literature 1, for example, discloses a reflective optical sensor as an optical sensor for detecting a movement of an object. This optical sensor, as illustrated in FIG. 9, includes a light emitting element 301 and two light receiving elements 302 and 303, with (i) the light receiving element 302 disposed on one side of the light emitting element 301 and (ii) the light receiving element 303 disposed on the other side thereof. In a case where a detection target object 304 is on the right side, light reflected from the detection target object 304 strikes the light receiving elements 302 and 303 in a large amount. On the other hand, in a case where the detection target object 304 is on the left side, light reflected from the detection target object 304 strikes the light receiving elements 302 and 303 in a large amount. The optical sensor calculates a difference between (i) a photocurrent generated in the light receiving elements 302 and (ii) a photocurrent generated in the light receiving element 303, and thus detects the position and movement of the detection target object 304.

Patent Literature 2 discloses a gesture sensor including optical sensors in multiple segments and a control circuit for processing a current outputted from each optical sensor.

CITATION LIST

Patent Literature

Patent Literature 1
Japanese Patent Application Publication, Tokukai, No. 2000-75046 (Publication Date: Mar. 14, 2000)

Patent Literature 2
U.S. Patent Application Publication No. 2012/280904 (Publication Date: Nov. 8, 2012)

SUMMARY OF INVENTION

Technical Problem

The conventional optical sensors described above are unfortunately problematic in that it is difficult for any of those optical sensors to detect a movement of a detection target accurately and regardless of a change in a relative positional relationship between the detection target object and that optical sensor.

For example, an electronic device including such a gesture sensor as described above is intended to detect a human hand. A change in the angle of a human hand relative to the gesture sensor changes the amount of light incident on the optical sensor. The gesture sensor is thus required to detect such a movement of a human hand. Further, human hands differ in shape from one another among different individuals, and when the electronic device is used, a human hand is often separated from the gesture sensor by varying distances.

Further, in a case where the gesture sensor is a reflective optical sensor, a human hand (detection target object) far from the optical sensor merely allows a very small amount of reflected light to enter the optical sensor. Even in such a case, the gesture sensor is required to accurately determine a movement of an object.

However, neither Patent Literature 1 nor Patent Literature 2 discloses any concrete measure for an optical sensor to accurately detect a movement of a detection target object regardless of a change in a relative positional relationship between the object and the optical sensor.

The present invention has been made in view of the above problem. It is an object of the present invention to provide an optical sensor and the like which can accurately detect a movement of a detection target regardless of a change in a relative positional relationship between the object and the optical sensor.

Solution to Problem

In order to solve the above problem, an optical sensor of one aspect of the present invention includes: a plurality of light receiving elements each for generating a photocurrent in response to receipt of (i) reflected light resulting from a detection target object reflecting light having been emitted by a light emitting element to the detection target object or (ii) ambient light not having been blocked by the detection target object, a first comparison section for comparing, with a predetermined threshold value, an absolute value of a ratio of (i) a difference between the respective photocurrents of at least two of the plurality of light receiving elements which at least two light receiving elements are arranged in a particular direction to (ii) a sum of the respective photocurrents of the at least two light receiving elements; and a movement direction determination section for, in a case where the first comparison section has determined that the absolute value of the ratio is larger than the predetermined threshold value, determining that the particular direction is a direction in which the detection target object is moving.

Advantageous Effects of Invention

An optical sensor of one aspect of the present invention can advantageously detect a movement of a detection target object accurately regardless of a change in a relative positional relationship between the detection target object and the optical sensor.

DESCRIPTION OF EMBODIMENTS

Figure 1:
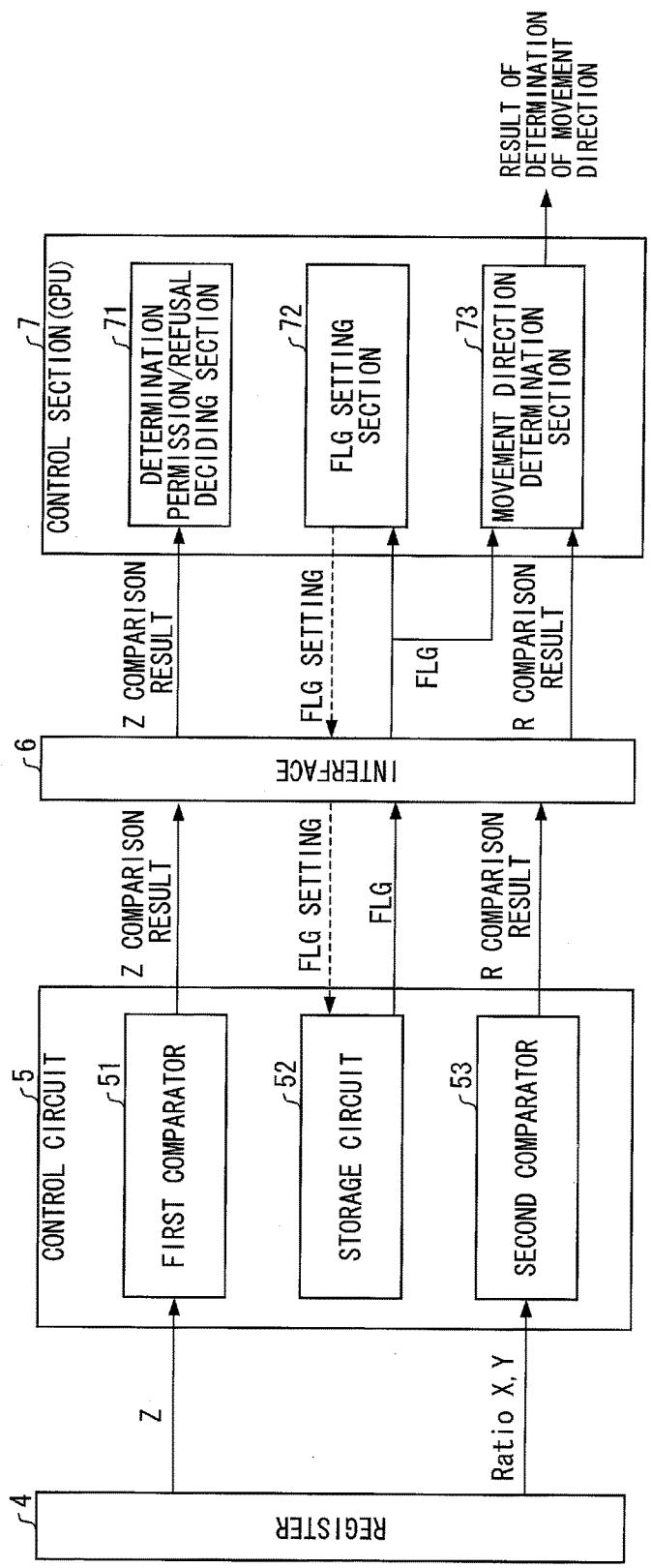
FIG. 1 is a block diagram illustrating a configuration of a main part of an optical sensor of Embodiment 1 (or Embodiment 3) of the present invention.

Following descriptions discuss embodiments of the present invention with reference to FIGS. 1 to 8. Any arrangement not described for a particular embodiment below is identical to a corresponding arrangement (if any) described for another embodiment. For convenience of description, members described for different embodiments but identical in function are assigned an identical reference sign, and a description of such members is omitted as appropriate. Further, the shape and dimensions (length, width, and depth) of any member illustrated in the drawings do not reflect the actual shape and dimensions, and are as changed appropriately for clear and simple illustrations.

The embodiments described below are each, as an example of the optical sensor of the present invention, a proximity sensor mounted in a smartphone or the like. The present invention is, however, not limited to such embodiments, and is applicable also to, for example, a gesture sensor for detecting a movement of a human hand.

Embodiment 1

Following descriptions discuss Embodiment 1 of the present invention with reference to FIG. 1 and (a) of FIG. 2 to FIG. 6.

<Mounting Structure for Light Emitting and Receiving Unit>

Figure 2:
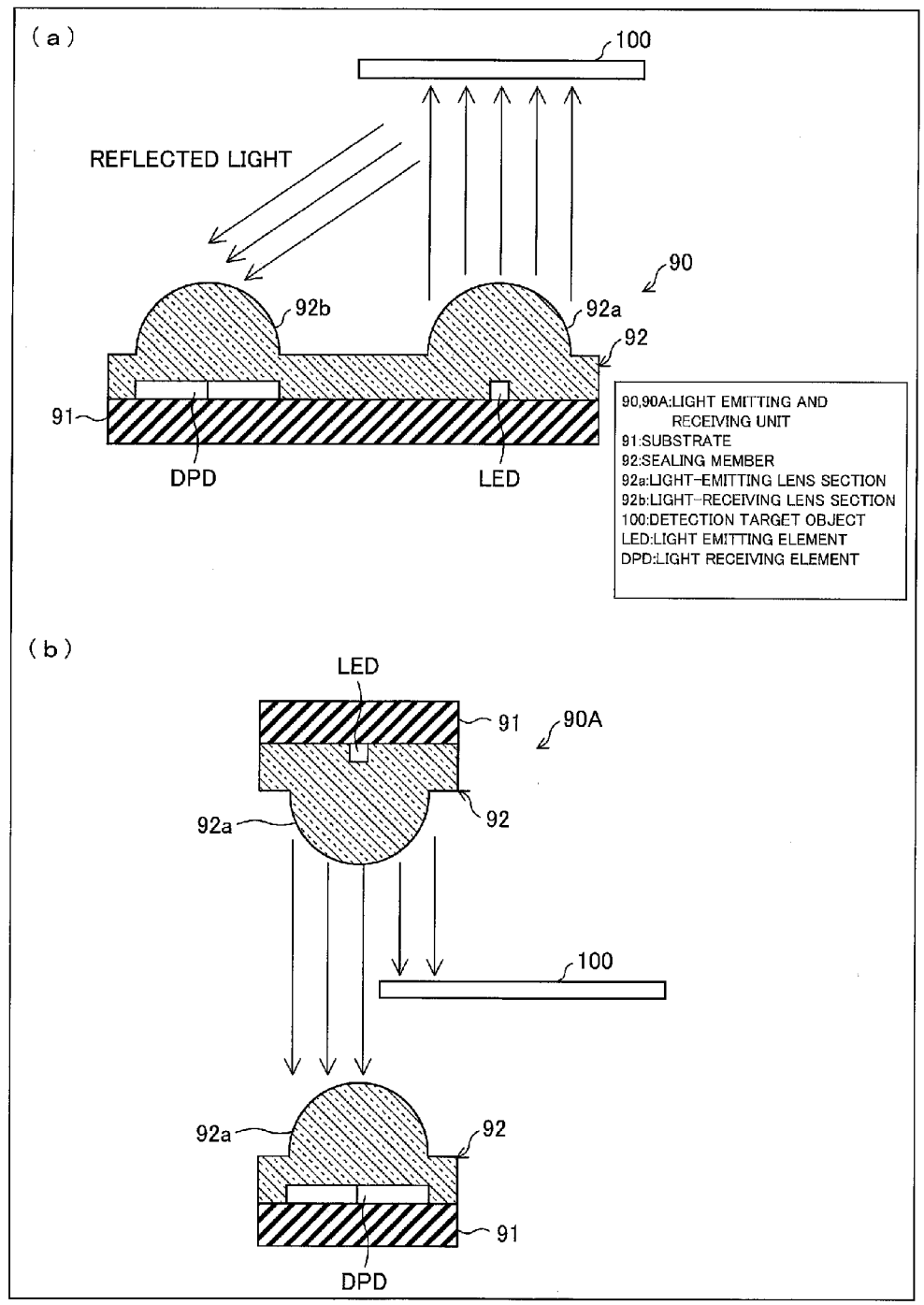
FIG. 2 is a longitudinal sectional view of a light emitting and receiving unit of the optical sensor of Embodiment 1 (or Embodiment 3) of the present invention, the view illustrating a mounting structure of the light emitting and receiving unit. (a) of FIG. 2 illustrates a mounting structure of a reflective light emitting and receiving unit of Embodiment 1 of the present invention. (b) of FIG. 2 illustrates a mounting structure of a transmissive light emitting and receiving unit of Embodiment 3 of the present invention.

(a) of FIG. 2 is a longitudinal sectional view of a light emitting and receiving unit 90 included in an optical sensor 101 described later of the present embodiment, the view illustrating how the light emitting and receiving unit 90 is structured to include, mounted therein, a light emitting element LED and a light receiving element DPD (namely, light receiving elements PD1 to PD4). Although the light emitting and receiving unit 90 of the present embodiment is a reflective optical sensor, the present invention is not limitedly applicable to such a reflective optical sensor. The present invention also encompasses, for example, a transmissive optical sensor such as a light emitting and receiving unit 90A described later of Embodiment 3 of the present invention.

As illustrated in (a) of FIG. 2, the light emitting and receiving unit 90 includes a light emitting element LED, a light receiving element DPD (namely, light receiving elements PD1 to PD4), a substrate 91, a sealing member 92, a light-emitting lens section 92a, and a light-receiving lens section 92b. The light emitting element LED and the light receiving elements PD1 to PD4 constituting the light receiving element DPD are mounted on the substrate 91 so as to be appropriately spaced from each other. The light emitting element LED includes a light-emitting diode. The light receiving element DPD includes an OPIC (optical IC; registered trademark), which integrates (i) a plurality of photodiodes or phototransistors with (ii) a signal processing circuit, an LED driver circuit, and the like.

The sealing member 92 is provided on the substrate 91 so as to cover the light emitting element LED and the light receiving element DPD. The sealing member 92 is made of (i) a transparent resin material or (ii) a visible light-cutting resin material that transmits any wavelength component of light emitted by the light emitting element LED and that cuts a visible light component. The sealing member 92 has a light-emitting lens section 92a and a light-receiving lens section 92b on a surface thereof. The light-emitting lens section 92a is a convex lens hemispherically curved toward a direction in which the light emitting element LED emits light. The light-emitting lens section 92a causes light from the light emitting element LED to be emitted so as to (i) converge onto a predetermined position or to (ii) be converted into parallel light. The light-receiving lens section 92b is a convex lens hemispherically curved toward a direction from which the light receiving element DPD receives light. The light-receiving lens section 92b causes light reflected from a detection target object 100 to converge onto the light receiving elements PD1 to PD4. Note that the light-emitting lens section 92a and the light-receiving lens section 92a are not necessarily provided. As disclosed in Patent Literature 2, providing a metal layer and the like over a light receiving element for directionality allows respective photocurrent output amounts of individual light receiving elements to differ from each other depending on the position of a detection target object. Such a structure, however, casts a shadow over a light receiving element and thus significantly reduces a signal light component emitted by a light emitting element.

Figure 4:
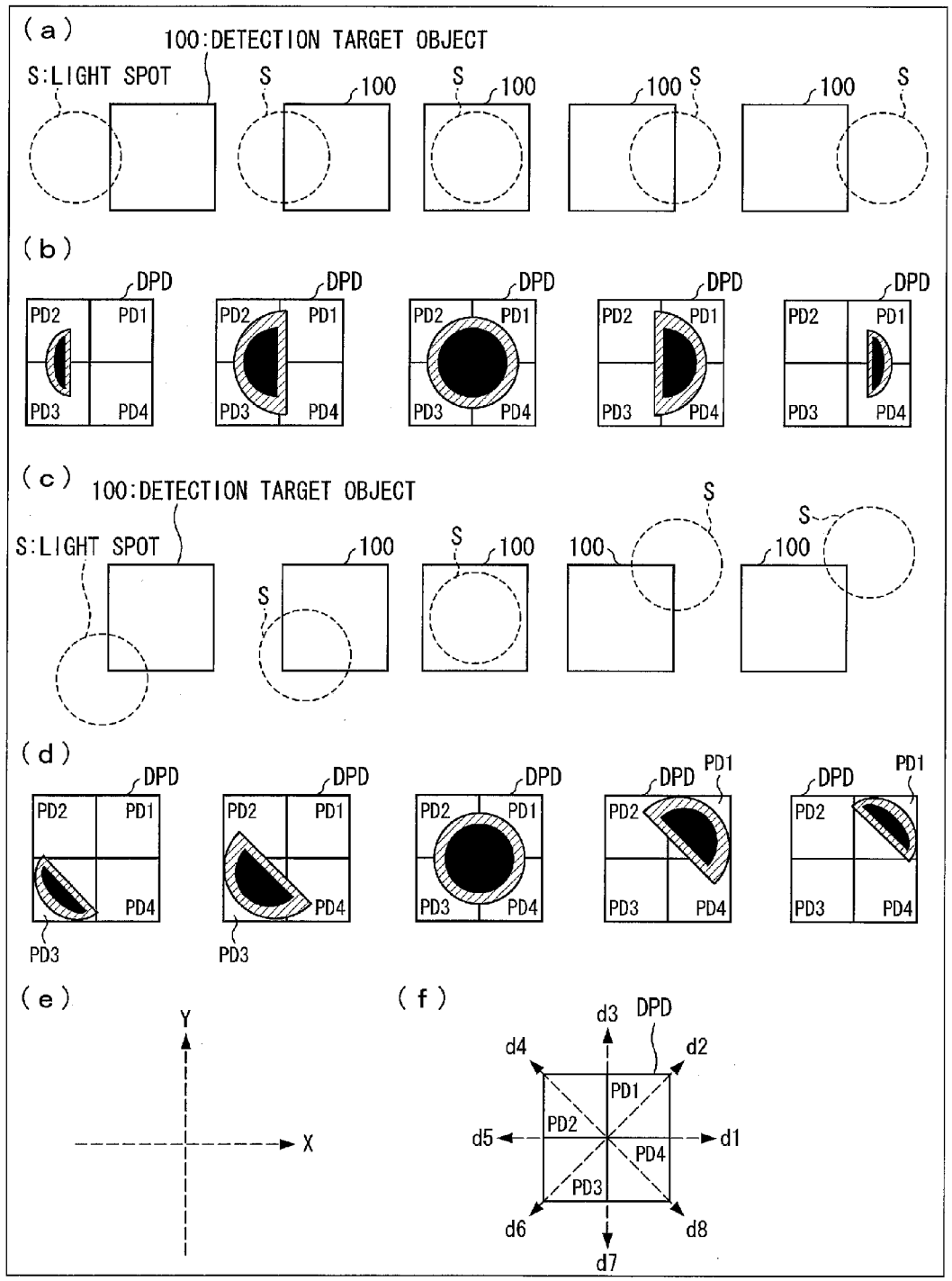
FIG. 4 shows planar diagrams illustrating (i) a target of detection by the optical sensor of FIG. 3 and (ii) a movement direction of the detection target object. (a) and (c) of FIG. 4 each show planar diagrams illustrating a change in positional relationship between (i) a light spot formed by light emitted by the light emitting element of the optical sensor of FIG. 3 and (ii) a detection target object. (b) and (d) of FIG. 4 each show planar diagrams illustrating how a light receiving element of the optical sensor of FIG. 3 receives a reflection of the light spot from a detection target object. (e) of FIG. 4 illustrates one example of movement directions (four directions) of the detection target object that are detected by the optical sensor. (f) of FIG. 4 illustrates another example of movement directions (eight directions) of the detection target object that are detected by the optical sensor.

As illustrated in (b) and (d) of FIG. 4, the light receiving element DPD includes light receiving elements PD1 to PD4 arranged in a grid pattern (that is, in a matrix). The individual light receiving elements are each structured as described later to generate a photocurrent that varies depending on the position of a detection target 100. In other words, the light receiving element DPD of the present embodiment is a four-part split light receiving element, and includes four light receiving elements PD1 to PD4. The light receiving element DPD is not limited to the present embodiment in terms of its structure. No matter what structure the light receiving element DPD may have, the optical sensor 101 of the present embodiment can accurately determine a movement of a detection target object 100 regardless of a positional relationship between the detection target object 100 and the optical sensor 101 (including the distance between the detection target object 100 and the optical sensor 101, and the angle of the human hand relative to the optical sensor 101). The light receiving element DPD may alternatively include, for example, at least two light receiving elements PD arranged in an array, in which case, however, the light receiving element DPD can merely detect a movement in only one direction.

<Configuration of Optical Sensor>

Figure 3:
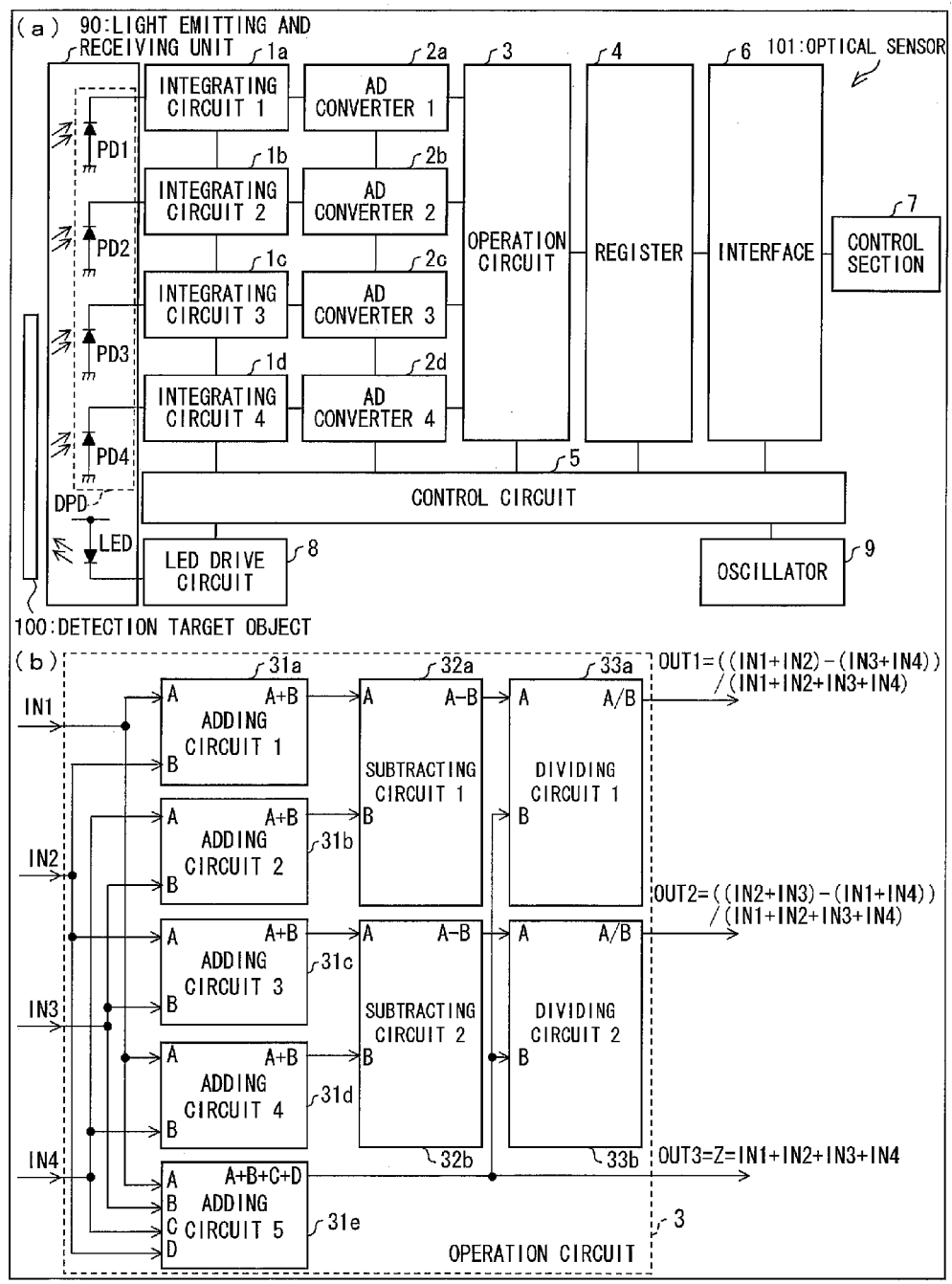
FIG. 3 is a block diagram illustrating (i) an entire configuration of the optical sensor of Embodiment 1 (or Embodiment 3) of the present invention and (ii) an operation circuit of the optical sensor. (a) of FIG. 3 illustrates the entire configuration of the optical sensor. (b) of FIG. 3 illustrates a configuration of the operation circuit of the optical sensor.

FIG. 3 is a block diagram illustrating an entire configuration of the optical sensor 101 of the present embodiment. As illustrated in FIG. 3, the optical sensor 101 includes a light emitting and receiving unit 90 [including a light receiving element DPD (namely, light receiving elements PD1 to PD4) and a light emitting element LED (light emitting diode)], integrating circuits 1a to 1d, AD converters 2a to 2d, an operation circuit 3, a register 4, a control circuit 5, an interface 6, a control section 7, an LED drive circuit 8, and an oscillator 9.

<Arrangement of Circuits>

The integrating circuits 1a to 1d (integrating circuits 1 to 4) each integrate a photocurrent inputted from a corresponding one of the light receiving elements PD1 to PD4, which constitute the light receiving element DPD. The AD converters 2a to 2d (AD converters 1 to 4) each have a function of converting an analog output signal from a corresponding integrating circuit into a digital signal (AD conversion).

<Integrating Circuits and AD Converters>

The integrating circuits 1a to 1d and the AD converters 2a to 2d may be any circuits and AD converters that can accurately convert respective photocurrent signals (analog signals) from the light receiving elements PD1 to PD4 into digital signals so that signals outputted from the light receiving element DPD are converted into digital values, which are easily processed in an electronic device. Examples of the integrating circuits 1a to 1d include a double integral circuit. Examples of the AD converters 2a to 2d include a ΔΣ conversion circuit.

<Control Circuit and Oscillator>

The control circuit 5 controls an operation of the entire optical sensor 101 on the basis of a reference clock from the oscillator 9. The control circuit 5, for example, generates a control signal to be transmitted for the LED drive circuit 8 for driving the light emitting element LED, and also generates a signal for controlling each of the integrating circuits 1a to 1d and the AD converters 2a to 2d in synchronization with the control signal. The control circuit 5 further causes the operation circuit 3 (described later) to operate in time sequence, that is, has a function of, upon an end of a measurement period for the integrating circuits 1a to 1d, transmitting, to the register 4, a signal for retrieving data. A configuration and operation of the control circuit 5 are described later in detail.

<Register>

The register 4 has a function of storing a digital value corresponding to an amount of a photocurrent that has been subjected to an AD conversion. The register 4 can include, for example, a sequential circuit (flip flop), but is not particularly limited to such an example. The present embodiment is arranged as illustrated in (a) of FIG. 3 such that the register 4 is connected to the AD converters 2a to 2d via the operation circuit 3. However, the register 4 is not necessarily provided as such. The present embodiment may alternatively be arranged, for example, such that (i) the register 4 directly receives and stores a digital value corresponding to the amount of a photocurrent that has been converted by the AD converters 2a to 2d and that (ii) the arithmetic operation is performed by the control section 7 (CPU), which is capable of an arithmetic operation and the like, via the interface 6 described later.

<Operation Circuit>

The operation circuit 3 has a function of performing arithmetic operations on digital values outputted from the AD converters 2a to 2d. (b) of FIG. 3 is a diagram illustrating a configuration of the operation circuit 3. The operation circuit 3, as illustrated in (b) of FIG. 3, includes (i) adding circuits 31a to 31e (adding circuits 1 to 5), (ii) subtracting circuits 32a and 32b (subtracting circuits 1 and 2), and (iii) dividing circuits 33a and 33b (dividing circuits 1 and 2).

The adding circuits 31a to 31d each output a sum of inputs A and B. The adding circuit 31e outputs a sum of inputs A, B, C, and D.

Assuming that the operation circuit 3 receives inputs IN1 to IN4, (i) the adding circuit 31a produces an output expressed by A+B=IN1+IN2, (ii) the adding circuit 31b produces an output expressed by A+B=IN3+IN4, (iii) the adding circuit 31c produces an output expressed by A+B=IN2+IN3, and (iv) the adding circuit 31d produces an output expressed by A+B=IN1+IN4.

The adding circuit 31e outputs a total (sum) of outputs A to D, which is expressed by A+B+C+D=IN1+IN2+IN3+IN4.

The subtracting circuits 32a and 32b each output a difference between inputs A and B. Assuming, for example, that the outputs from the adding circuits serve as inputs for the subtracting circuits 32a and 32b, the subtracting circuit 32a produces an output expressed by A−B=(IN1+IN2)−(IN3+IN4), whereas the subtracting circuit 32b produces an output expressed by A−B=(IN2+IN3)−(IN1+IN4).

The dividing circuits 33a and 33b each output a quotient of inputs A and B. For example, upon receipt of outputs from the adding circuits and the subtracting circuits, the dividing circuit 33a produces an output expressed by A/B=[(IN1+IN2) (IN3+IN4)]/(IN1+IN2+IN3+IN4).

The dividing circuit 33b produces an output expressed by A/B=[(IN2+IN3)−(IN1+IN4)]/(IN1+IN2+IN3+IN4).

<Interface>

The interface 6 is not particularly limited in terms of configuration. The interface 6 may, for example, include a circuit for outputting a digital value from the register 4 as serial data SDA in synchronization with a serial clock SCL supplied from the outside to an I2C bus.

<LED Drive Circuit, Light Emitting Element LED>

Upon receipt of an LED driving signal generated by the control circuit 5 on the basis of a reference clock from the oscillator 9, the LED drive circuit 8 outputs an optical pulse signal, for example, a pulse width modulation (PWM) signal. The light emitting element LED of the present embodiment emits light at a predetermined interval on the basis of such an optical pulse signal so as to output an infrared optical pulse.

<Main Part of Optical Sensor>

The description below deals in detail with an arrangement of a main part of the optical sensor 101 with reference to FIG. 1. As illustrated in FIG. 1, the main part of the optical sensor 101 includes the register 4, the control circuit 5, the interface 6, and the control section 7 (central processing unit; CPU). The control circuit 5, as illustrated in FIG. 1, includes a first comparator (second comparison section) 51, a storage circuit 52, and a second comparator (first comparison section) 53. The control section 7 includes a determination permission/refusal deciding section 71, a FLG setting section 72, and a movement direction determination section (movement direction determination means) 73.

<First Comparator 51>

The first comparator 51 compares an input Z (that is, a sum of photocurrents) from the register 4 with a predetermined current value Z_th and transmits a result of the comparison (Z comparison result) to the determination permission/refusal deciding section 71 of the control section 7 via the interface 6.

<Storage Circuit 52>

The storage circuit 52 stores respective values of flags S_FLG and ME_FLG set by the FLG setting section 72 of the control section 7 which values are recorded via the interface 6.

<Second Comparator 53>

The second comparator 53 compares an output Ratio_X or Ratio_Y (ratio) from the register 4 with a predetermined threshold value Ratio_th and transmits a result of the comparison (R comparison result) to the movement direction determination section 73 of the control section 7 via the interface 6. The ratio (for example, Ratio_X) can have one of two signs, that is, positive and negative. However, the comparison (described later) by the second comparator 53, in theory, simply requires the threshold value Ratio_th to be positive only. More specifically, the second comparator 53 may perform a comparison described later by, (i) in a case where Ratio_X is positive, comparing it directly with the positive threshold value Ratio_th and (ii) in a case where Ratio_X is negative, calculating the absolute value of Ratio_X and comparing it with the positive threshold value Ratio_th so as to determine, regardless of the sign of Ratio_X, whether the absolute value of Ratio_X exceeds the positive threshold value Ratio_th.

<Determination Permission/Refusal Deciding Section 71>

The determination permission/refusal deciding section 71 decides on the basis of the Z comparison result whether the movement direction determination section 73 will perform a process of determining the direction in which a detection target 100 is moving. Specifically, the determination permission/refusal deciding section 71 decides, (i) if Z≥Z_th, that the movement direction determination section 73 will perform the determination process and (ii) if Z<Z_th, that the movement direction determination section 73 will not perform the determination process.

As described later, a larger output Z increases such effects as the effect of reducing variation and the effect of cancelling out disturbance. Thus, the above arrangement can reduce, for example, (i) an error in an amount of light received by the light receiving element DPD (or the light receiving elements PD1 to PD4) which error arises from a tolerance in production of the light receiving element DPD and/or from an angle of a human hand as a detection target object and (ii) an influence of disturbance so that the movement direction determination section 73 can more accurately determine the direction in which a detection target object 100 is moving.

<FLG Setting Section 72>

The FLG setting section 72 sets respective values of S_FLG and ME_FLG. S_FLG has an initial value of 0. In a case where the second comparator 53 has determined when S_FLG=0 that Ratio_X≤−Ratio_th or Ratio_X≤−Ratio_th, the FLG setting section 72 sets S_FLG to 1. When the movement direction determination section 73 has ended a process of determining the direction in which a detection target object 100 is moving, the FLG setting section 72 initializes S_FLG.

The FLG setting section 72 sets ME_FLG to, for example, (i) X+ in a case where Ratio_X≥Ratio_th when S_FLG=1 and (ii) X− in a case where Ratio_X≤−Ratio_th when S_FLG=1. The FLG setting section 72 sets ME_FLG to (i) X− in a case where Ratio_X≥Ratio_th when S_FLG=1 and (ii) X+ in a case where Ratio_X≤−Ratio_th when S_FLG=1. When the movement direction determination section 73 has ended a process of determining the direction in which a detection target object 100 is moving, the FLG setting section 72 initializes all the flags ME_FLG.

<Movement Direction Determination Section 73>

The movement direction determination section 73 determines the movement direction of a detection target object 100 in a case where the second comparator 53 has determined that (i) the output Ratio_X is larger than the threshold value Ratio_th having a sign identical to that of the output Ratio_X and has further determined that (ii) the absolute value of another output Ratio_X having a sign different from that of the above output Ratio_X is larger than the absolute value of another threshold value −Ratio_th having a sign different from that of the above threshold value Ratio_th. The movement direction determination section 73, with the above arrangement, determines the movement direction of a detection target object 100 on the basis of respective results of two determination processes. This arrangement allows the movement direction determination section 73 to determine the movement direction of a detection target object 100 more accurately than determining the movement direction of a detection target object 100 on the basis of a result of only one of such two comparisons between an output Ratio_X and a threshold value Ratio_th.

[Operation of Optical Sensor]

<Basic Operation>

Upon receipt of the LED driving signal generated by the control circuit 5 on the basis of a reference clock from the oscillator 9, the LED drive circuit outputs an optical pulse signal (for example, the PWM signal). The light emitting element LED emits light at a predetermined interval on the basis of such optical pulse signal so as to output an infrared optical pulse.

In a case where no detection target object 100 is on an optical path of light emitted by the light emitting element LED, such light emitted by the light emitting element LED travels without being reflected. The light receiving element DPD thus does not receive reflected light from a detection target object 100, but merely receives ambient light only. The light receiving elements PD1 to PD4 thus receive light in only a small amount. In this case, the optical sensor 101 detects no detection target object 100.

In a case where a detection target object 100 has become closer to the light emitting and receiving unit 90 so as to reach a position on the optical path of light emitted by the light emitting element LED, such light emitted by the light emitting element LED is reflected by the detection target object 100. As a detection target object 100 becomes closer to the light emitting and receiving unit 90, the detection target object 100 reflects a larger amount of light.

In a case where the detection target object 100 has reached a position at which it (i) blocks the optical path completely and (ii) reflects all of the light emitted by the light emitting element LED, the detection target object 100 is closest to the light emitting and receiving unit 90. The detection target object 100 reflects a maximum amount of light in this state. The light receiving elements PD1 to PD4 receive reflected light from the detection target object 100, so that the amount of light incident on the light receiving elements PD1 to PD4 increases. The light receiving elements PD1 to PD4 thus each generate a photocurrent proportional to the amount of light incident thereon.

The optical sensor 101 is arranged as follows: The light receiving elements PD1 to PD4 produce respective photocurrents. The integrating circuits 1a to 1d integrate the respective photocurrents so as to provide respective integrated values. The AD converters 2a to 2d convert the respective integrated values into respective digital integrated values. The operation circuit 3, on the basis of the digital integrated values, outputs a detection signal for detecting an approach of a detection target object 100. The detection signal is then outputted to the control section 7 via the interface 6.

The optical sensor 101, (i) in a case where it is used as a proximity sensor, outputs a detection signal in response to an approach of a detection target object 100 and, (ii) in a case where it is used as a gesture sensor, detects a movement of a detection target object 100.

<Detection of Light by the Light Receiving Element>

(a) and (c) of FIG. 4 each show planar diagrams illustrating a change in positional relationship between (i) a light spot S formed by light emitted by the light emitting element LED and (ii) a detection target object 100. (b) and (d) of FIG. 4 each show planar diagrams each illustrating how the light receiving element DPD of the light emitting and receiving unit receives a reflection of the light spot S from a detection target object 100.

As described earlier, the light receiving element DPD is a four-part split light receiving element, and includes four light receiving elements (PD1 to PD4) [see (b) and (d) of FIG. 4]. Reflected light from a detection target object 100 (light spot S) is projected onto the light receiving element DPD so as to form an image in a shape that changes depending on the position of the detection target object 100 (see (a) to (d) of FIG. 14). Thus, in a case where the optical sensor 101 includes a four-part split light receiving element DPD as described above, the optical sensor 101 can detect the position of the detection target object 100 relative to the light emitting and receiving unit 90 by measuring the respective amounts of light incident on the individual light receiving elements PD1 to PD4 of the light receiving element DPD. The present embodiment uses, as the light receiving element DPD, a split-type light receiving element DPD including four light receiving elements PD1 to PD4. The number of light receiving elements included in the light receiving element DPD is, however, not limited to four. The light receiving element DPD simply needs to include, for example, at least two light receiving elements in view of the principle of the present invention.

The description below deals with a case in which a detection target object 100 moves, as illustrated in (a) of FIG. 4, from right to left with respect to a light spot S formed by light emitted by the light emitting element LED. First, a reflection of the light spot S from the detection target object 100 is projected through a light-receiving lens section 92b (convex lens) of the light emitting and receiving unit 90 onto the light receiving element DPD so as to form an inverted image.

While a detection target object 100 is moving from the right to the center of the light spot S as illustrated in the first and second diagrams from the left in (a) of FIG. 4, reflected light is projected onto the light receiving elements PD2 and PD3. During this period, the light receiving elements PD2 and PD3 each generate a photocurrent proportional to the intensity of the incident light. While the detection target object 100 is at a position at which it completely reflect the light spot S as illustrated in the third diagram from the left in (a) of FIG. 4, reflected light is projected onto all the light receiving elements PD1 to PD4. During this period, the light receiving elements PD1 to PD4 each generate a photocurrent proportional to the intensity of the incident light. While the detection target object 100 is moving away from the center of the light spot S to the left as illustrated in the fourth and fifth diagrams from the left in (a) of FIG. 4, reflected light is projected onto the light receiving elements PD1 and PD4. During this period, light receiving elements PD1 and PD4 each generate a photocurrent proportional to the intensity of the incident light.

Next, description below deals with a case in which the detection target object 100 is shifted from upper right to lower left with respect to the light spot S formed by the light emitted by the light emitting element LED (see (c) of FIG. 4). First, the reflection of the light spot S from the detection target object 100 is projected through the light-receiving lens section 92b of the light emitting and receiving unit 90 onto the light receiving element DPD so as to form the inverted image.

First, as illustrated at a left end and a right side thereof of (c) of FIG. 4, in a case where the detection target object 100 approaches from upper right, the reflected light is mainly projected onto the light receiving element PD3. During this period, the light receiving element PD3 generates the photocurrent proportional to an intensity of the incident light. Next, as illustrated at a center of (c) of FIG. 4, while the detection target object 100 is at a positioned at which completely reflect the light spot S, the reflected light is projected onto all the light receiving elements PD1 to PD4. During this period, the light receiving elements PD1 to PD4 each generate the photocurrent proportional to an intensity of the incident light. Third, as illustrated at a right end and a left side thereof of (c) of FIG. 4, while the detection target object 100 is moving away to the downward left, the reflected light is projected onto the light receiving element PD1. During this period, the light receiving element PD1 generates the photocurrent proportional to an intensity of the incident light.

Reflected light projected onto the light receiving element DPD forms an image in a shape that changes depending on the position of a detection target object 100 with respect to a light spot S. Such a change, as described above, causes a change in the respective photocurrents of the individual light receiving elements PD1 to PD4 of the light receiving element DPD. This makes it possible to determine a relative positional relationship between the light emitting and receiving unit 90 and the detection target object 100 on the basis of the respective photocurrents of the light receiving elements PD1 to PD4. Further, calculating a temporal change in the position of the detection target object 100 makes it possible to detect the speed and direction of a movement of the detection target object 100. Detecting the position of a detection target object 100 accurately, however, requires the optical sensor 101 to operate without being affected by disturbance light such as illuminating light or sunlight. (b) of FIG. 4 shows, in an image projected onto the light receiving element DPD, a black portion and a shaded portion to respectively indicate a portion with a high light intensity and a portion with a low light intensity.

<Movement Direction of Detection Target Object Detected by Optical Sensor>

The optical sensor 101 may detect (i) two directions of a movement of a detection target object such as directions X and Y in (e) of FIG. 4 [corresponding to a detection pattern of (a) and (b) of FIG. 4] or (ii) eight directions of a movement of a detection target object such as directions D1 to D8 in (f) of FIG. 4 [corresponding to a detection pattern of (a) to (d) of FIG. 4].

In a case where the optical sensor 101 detects a movement from the direction d2 to the direction d6 as in (c) and (d) of FIG. 4, the optical sensor 101 may calculate, for a ratio of a difference in photocurrents to a sum of photocurrents, (i) a ratio of $(I1-I3)/(I1+I2+I3+I4)$ or (ii) a ratio of $(I1-I3)/(I1+I3)$. In a latter case, the ratio has a maximum value of 1 and a minimum value of $-1$, which means that the optical sensor 101 can determine a movement direction with use of parameters that share a threshold value with the X and Y directions. The latter case thus eliminates the need to set different threshold values for the parameters and for the X and Y directions, and can reduce the number of parameters necessary for the process. Further, the latter case allows use of smaller scale hardware for which hardware a threshold value is set to determine a movement direction with use of the optical sensor 101.

<Light Signal Received from Detection Target Object at Short or Long Distance>

In a case where the optical sensor 101 is a reflective optical sensor, it receives a light signal in an amount (amount of light received) that varies depending on whether the detection target object 100 is close to or far from the optical sensor 101. (a) to (c) of FIG. 5 each illustrate a change in the amount of a light signal received in a case where a detection target object 100 has moved past the light emitting and receiving unit 90 with a certain speed.

Figure 5:
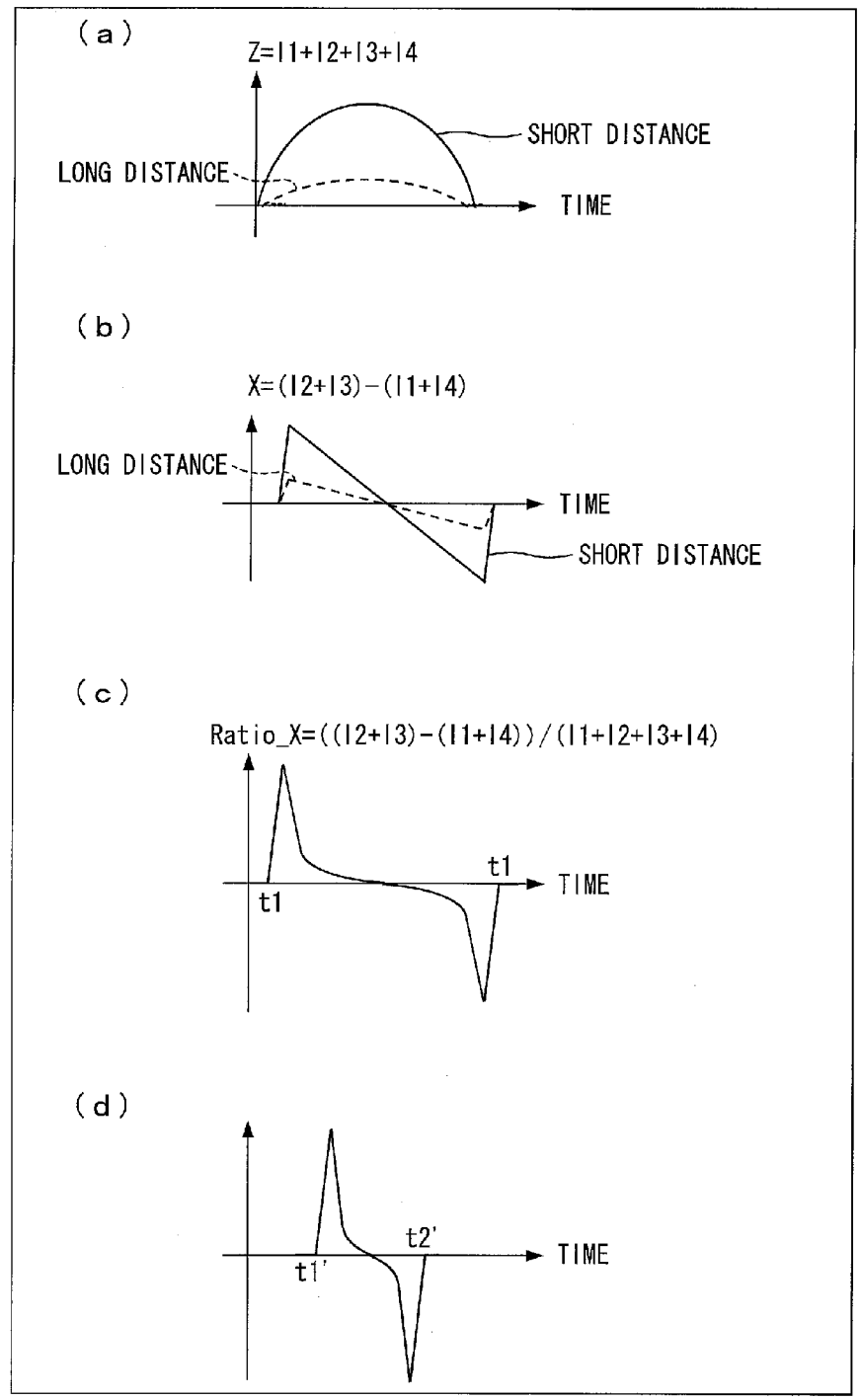
FIG. 5 illustrates examples of how a photocurrent detected by a light receiving element changes over time on the basis of a movement of a detection target object. (a) of FIG. 5 illustrates an example of a sum of the respective photocurrents outputted from individual light receiving elements changes over time. (b) of FIG. 5 illustrates an example of how a difference between respective photocurrents outputted by at least two light receiving elements arranged in a particular direction changes over time. (c) of FIG. 5 illustrates an example of how a ratio of the difference between the photocurrents to the sum of the photocurrents changes over time. (d) of FIG. 5 illustrates another example of how the ratio changes over time.

(a) of FIG. 5 is a graph illustrating a result of measuring, with use of the light emitting and receiving unit 90 at a sufficient velocity, the amount of a photocurrent, that is, a total of the respective amounts of photocurrents I1 to I4 ($Z=I1+I2+I3+I4$) outputted by the respective light receiving elements PD1 to PD4. (a) of FIG. 5 shows a horizontal axis as a time axis for a case where the detection target object 100 is moving. (a) of FIG. 5, in other words, illustrates how the amount of a received light signal changes with a change in a relative positional relationship between the light emitting and receiving unit 90 and a detection target object 100. (a) of FIG. 5 shows (i) a solid line to illustrate a case where a detection target object 100 has moved past the light emitting and receiving unit 90 at a short distance and (ii) a broken line to illustrate a case where a detection target object 100 has moved past the light emitting and receiving unit 90 at a long distance. In the case where the optical sensor 101 is a reflective sensor, it receives (i) a large amount of a light signal from a detection target object 100 close to the optical sensor 101 and (ii) a small amount of a light signal from a detection target object 100 far from the optical sensor 101.

(b) of FIG. 5 illustrates a result of performing an arithmetic operation that returns a result which, in a case where a detection target object 100 moves past as illustrated in (a) of FIG. 4, varies depending on the position of the detection target object 100 relative to light receiving elements PD1 to PD4. In a case where, for instance, a detection target object approaches the light receiving element DPD from a side of the light receiving elements PD1 and PD4 and moves past the light receiving element DPD on a side of the light receiving elements PD2 and PD3 as illustrated in (a) and (b) of FIG. 4, the optical sensor 101 simply needs to calculate a difference $X=(I2+I3)-(I1+I4)$ to determine the direction in which the detection target object 100 is moving.

(b) of FIG. 5 indicates that the difference X has an amplitude that varies depending on whether a detection target object 100 moves past the optical sensor 101 at a short distance or a long distance. This may unfortunately lead to a difference between (i) determining a movement direction at a short distance and (ii) determining a movement direction at a long distance. In a case where, for instance, (i) a certain threshold value has been set for the difference X, and (ii) the optical sensor 101 is arranged to determine the movement direction of a detection target object 100 if the difference X exceeds the threshold value, that threshold value needs to be low so that the movement direction can be determined even on the basis of a small amplitude for the case where a detection target object 100 moves past the optical sensor 101 at a long distance. Typical optical sensors unfortunately make errors in detection due to disturbance light. Further, an optical sensor may suffer from a decrease in the S/N ratio as a result of noise from a light receiving element and a sensor circuit. Lowering the threshold value may let such disturbance light or noise cause, for example, any optical sensor to (i) erroneously determine the movement direction of a detection target object 100 or to (ii) even become incapable of determining such a movement direction at all.

In order to solve such a problem, the optical sensor 101 calculates, for example, $\text{Ratio\_X}=[(I2+I3)-+I4)]/(I1+I2+I3+I4)$. (c) of FIG. 5 is a graph showing how Ratio_X changes, the graph showing (i) a vertical axis indicative of a value of Ratio_X and (ii) a horizontal axis serving as a time axis. The graph of (c) of FIG. 5 illustrates a waveform that does not depend on the distance between a detection target object 100 and the optical sensor 101, that is, the waveform varies little with such a distance. The waveform oscillates with a maximum value of 1 and a minimum value of $-1$. With this arrangement, setting a given threshold value Ratio_th for Ratio_X allows an accurate determination of the movement direction of a detection target object 100 regardless of the distance between the detection target object 100 and the optical sensor 101. For example, optical sensors are produced with IC chips included therein, and thus have a production tolerance. Even in a case where such a production tolerance has caused a variation in light sensitivity among individual optical sensors, such a variation is reduced because the movement direction is determined on the basis of a ratio. Ratio_X corresponds to an output OUT2 of the operation circuit 3, whereas Ratio_Y corresponds to an output OUT1. Z corresponds to an output OUT3 of the operation circuit 3.

A human hand, in a case where it moves over an optical sensor, does not necessarily do so horizontally. Even in a case where, for instance, a human hand moves over the optical sensor 101 at a varying distance, that is, a human hand moves over the optical sensor 101 obliquely with respect to the vertical direction, the optical sensor 101 can accurately determine the movement direction of the human hand because Ratio_X and Ratio_Y outputted each have a value that does not depend on the distance between the detection target object and the optical sensor 101.

(d) of FIG. 5 illustrates a case where a detection target object 100 is moving faster than in the case of (c) of FIG. 5. (d) of FIG. 5 shows a time interval t1'-t2' shorter than a time interval t1-t2 shown in (c) of FIG. 5. The time intervals t1-t2 and t1'-t2' are each a time interval over which the sign of the threshold value Ratio_X is reversed. Measuring the time interval over which the sign of the threshold value Ratio_X is inverted as such makes it possible to specify the speed at which the detection target object 100 is moving. More specifically, dividing the distance between two light receiving elements PD next to each other by the time interval makes it possible to specify the speed at which the detection target object 100 is moving.

<Method for Determining Movement Direction of Detection Target Object>

The description below deals with a concept of a method for determining the movement direction of a detection target object 100. The description below assumes that the control section 7 determines the movement direction of a detection target object 100 via the interface 6.

First, the control section 7 activates the optical sensor 101. In a case where the optical sensor 101 includes a digital circuit, the control section 7 initializes the digital circuit at the activation.

Next, the optical sensor waits for a period sufficient for the optical sensor to actually measure a received light signal. In a case where this measurement period is shorter, the optical sensor more likely samples sufficient data even with a higher speed at which a detection target object 100 is moving. However, in a case where the measurement period is long, the optical sensor is unable to detect a movement of the detection target object 100. The optical sensor may be unable to detect such peak values as shown in the graph of (c) of FIG. 5 that correspond to the position of the detection target object 100. An actual human hand is assumed to move at a speed of approximately 1 m/s. Thus, the optical sensor desirably finishes measuring a received light signal within a period of at most 10 msec although such a period depends on, for example, the angle at which the light receiving element detects a detection target object and/or angle at which the light emitting element emits light. This measurement period serves as a sampling rate for the control section 7 for determining the movement direction of a detection target object 100, and may be regarded as a wait period that extends until the optical sensor 101 finishes updating data.

Then, the control section 7 obtains data corresponding to received light signals and performs an arithmetic operation on the data. Specifically, the control section 7 reads, via the interface, a result of an arithmetic operation performed by the optical sensor 101 as described above. The control section 7, through the arithmetic operation, determines the movement direction of the detection target object 100 on the basis of raw data of the received light signals. Basically, the optical sensor 101 performs the measurement, the data obtaining, and the arithmetic operation repeatedly regardless of whether the optical sensor 101 determines the movement direction of a detection target object 100.

Figure 6:
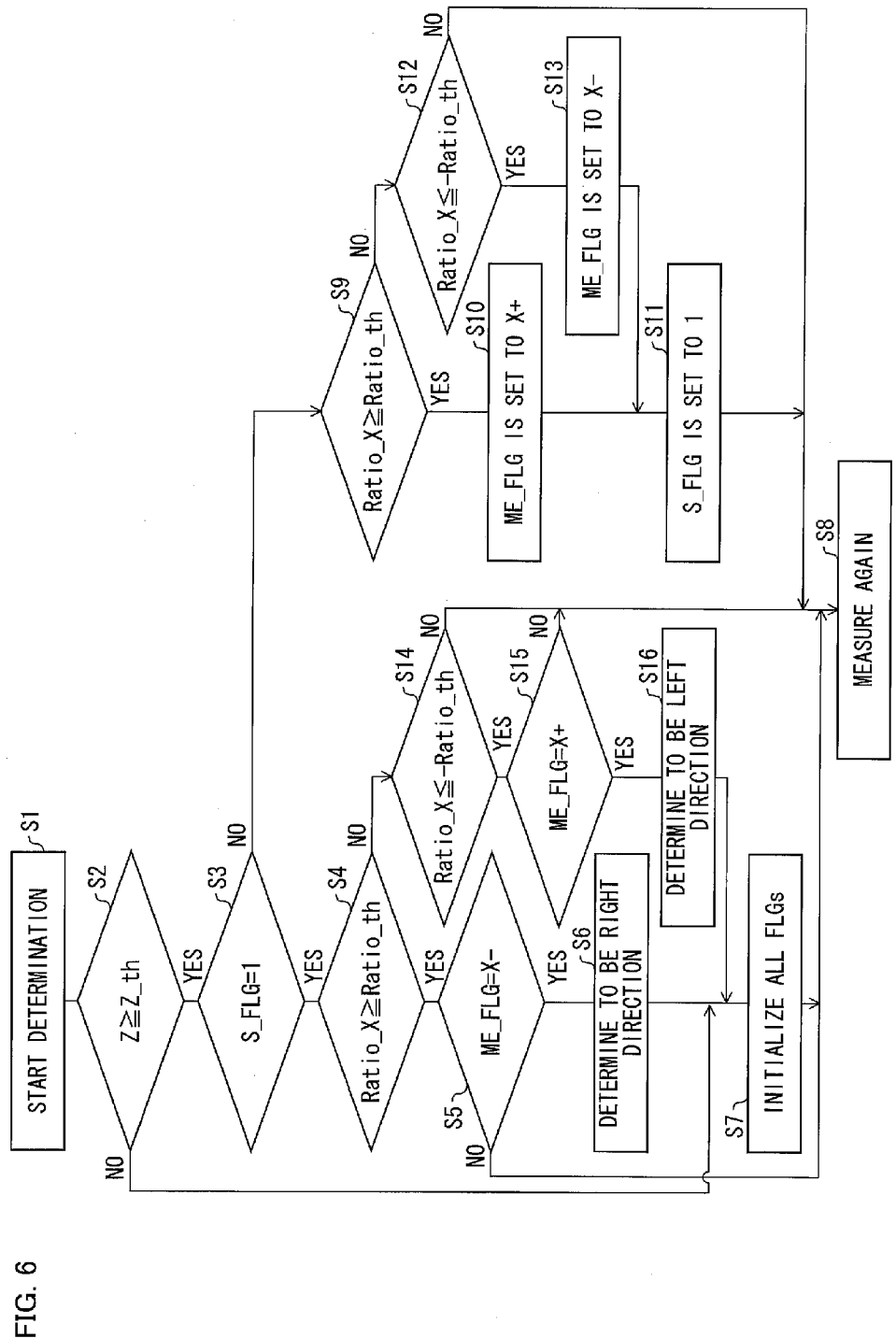
FIG. 6 is a flow chart illustrating a flow of operations of the respective optical sensors of embodiments (Embodiments 1 to 3) of the present invention.

With reference to FIGS. 1 and 6, the following descriptions discuss a procedure through which the optical sensor 101 determines the movement direction of a detection target object 100.

The determination based on the method described below is assumed to be performed by a control program for causing the control section 7 (computer) illustrated in FIG. 1 to operate as each means of the optical sensor 101. However, the determination can also be easily performed by even an optical sensor including a digital circuit.

First, this paragraph discusses the symbols shown in FIG. 6. Z is the sum of all received light signals as described above, and is expressed by Z=I1+I2+I3+I4. Z_th is a threshold value (current value) for Z, and is set in view of, for example, the S/N ratio of the optical sensor 101. Ratio_X is, as described above, a ratio of a difference between photocurrents to the sum of the photocurrents. Ratio_th is a threshold value set for Ratio_X and/or Ratio_Y on the assumption of the determination of two directions of (e) of FIG. 4. S_FLG and ME_FLG are each a flag whose state is, as described above, stored in the storage circuit 52 shown in FIG. 1. S_FLG=1 indicates that Ratio_X has an absolute value larger than the threshold value Ratio_th (or its absolute value) at the first determination. S_FLG has an initial value of 0. S_FLG is a binary variable in the program code. ME_FLG is set to (i) X+ in a case where Ratio_X and/or Ratio_Y exceeds a positive threshold value Ratio_th for the first time and to (ii) X− in a case where Ratio_X and/or Ratio_Y falls below a negative threshold value −Ratio_th for the first time. X+ and X− may be 1 and 2 respectively in the program code. ME_FLG can have the value 0 as its initial value to represent an initial state.

In a case where the control section 7 shown in FIG. 1 has activated the optical sensor 101, a process for the determination starts (S1 of FIG. 6). The determination permission/refusal deciding section 71 receives a Z comparison result from the first comparator 51 via the interface 6 and decides whether to determine the movement direction of a detection target object 100 (S2).

Next, the movement direction determination section 73 reads S_FLG from the storage circuit 52. If S_FLG=1, which indicates a transition from a state in which Ratio_X is already larger than the threshold value Ratio_th at the first determination, the process proceeds to S4. If S_FLG=0, the process proceed to S9.

Next, at S9, the movement direction determination section 73 compares Ratio_X with Ratio_th (positive value) in a case where Ratio_X is positive. If Ratio_X≥Ratio_th, the process proceeds to S10. The movement direction determination section 73 may determine at S9 from which side the detection target object 100 has approached the optical sensor 101. If Ratio_X<Ratio_th, the process proceeds to S12.

At S10, the FLG setting section 72 sets ME_FLG to X+ and records the setting in the storage circuit 52. The process then proceeds to S11. At S11, the FLG setting section 72 sets S_FLG to 1 and records the setting in the storage circuit 52. The process then proceeds to S8.

At S12, the movement direction determination section 73 compares Ratio_X with −Ratio_th (negative value) in a case where Ratio_X is negative, and if Ratio_X≤−Ratio_th, a process proceeds to S13. The movement direction determination section 73 may determine from which side the detection target object 100 has approached the optical sensor 101. If Ratio_X<Ratio_th, a process proceeds to S8.

At S13, the FLG setting section 72 sets S_FLG to 1 and records the setting in the storage circuit 52. The process then proceeds to S8.

The following descriptions discuss a method of the present embodiment for determining the movement direction of a detection target object 100 as illustrated in (c) of FIG. 5, which shows a horizontal axis serving as a time axis. The descriptions below assume that a detection target object 100 approaches the optical sensor 101 from the side of the light receiving elements PD1 and PD4 in (b) of FIG. 4. Z (that is, the sum Z of all the photocurrents at the light receiving elements PD1 to PD4 of the light receiving element DPD) does not satisfy Z≥Z_th at S2 of FIG. 6 until Z exceeds the threshold value Z_th. Thus, until then, the optical sensor 101 does not determine the movement direction of the detection target object 100 on the basis of, for example, a calculation result. During this procedure, the photocurrents are each converted into a digital value for output. In this case, Ratio_X may be calculated at −1 in a case where, for example, (i) only a value corresponding to I1 outputs I1=1 count and (ii) I2=I3=I4=0. Further, in the above case, only one received light signal may be highly sensed depending on the optical sensor circuit or a variation among the individual light receiving elements. Assuming that the detection target object 100 is a human hand, even in a case where that person intends to be moving the hand in a lateral direction (X direction), a particular one or more of the light receiving elements PD1 to PD4 may likely receive a reflected signal depending on a tilt of the human hand. Such a variation or cause of error is effectively eliminated by setting a threshold value Z_th.

Next, the process proceeds from S1 (start of a second determination) to S3. At S3, the movement direction determination section 73 checks a value of S_FLG read from the storage circuit 52. During this second determination as a result of a transition from the first determination, the movement direction determination section 73 obtains information indicative of S_FLG 1. The process thus proceeds to S4.

The movement direction determination section 73 compares Ratio_X with Ratio_th (positive value) in a case where Ratio_X is positive, and if, at S4, Ratio_X≥Ratio_th, a process proceeds to S5. If Ratio_X<Ratio_th, a process proceeds to S14.

At S5, the movement direction determination section 73 checks a value of ME_FLG read from the storage circuit 52. If ME_FLG has been set to X−, the process proceeds to S6. At S6, the movement direction determination section 73 determines as a result that the detection target object has moved from left to right. The process then proceeds to S7. At S7, the FLG setting section 72 initializes all FLGs. The process then proceeds to S8.

The movement direction determination section 73 compares Ratio_X with −Ratio_th (negative value) in a case where Ratio_X is negative. If Ratio_X≤−Ratio_th at S14, a process proceeds to S15. Meanwhile, if Ratio_X<Ratio_th, a process proceeds to S8.

The movement direction determination section 73 checks a value of ME_FLG read from the storage circuit 52. If ME_FLG has been set to X+ at S15, the process proceeds to S16. At S16, the movement direction determination section 73 determines as a result that the detection target object has moved from right to left. The process then proceeds to S7. At S7, the FLG setting section 72 initializes all FLGs. The process then proceeds to S8.

As described above, the optical sensor 101 can determine the movement direction of a detection target object 100 more accurately by desirably determining the movement direction on the basis of whether Ratio_X has a reversed sign at a subsequent determination (S4, S5, S14, and S15). With reference to, for example, the time axis of (c) of FIG. 5, ME_FLG is first set to X+ (S10), and S_FLG is then set to 1 (S11). The optical sensor 101 goes on to obtain subsequent received light signal data so as to repeat the calculation. In a case where ME_FLG is set to X+ at the first determination (S10), Ratio_X is expected to satisfy Ratio_X≤−Ratio_th (S14). If Ratio_X does not satisfy this condition, the optical sensor 101 performs the measurement again (S8). It is only in a case where Ratio_X satisfies the above condition that the optical sensor 101 determines that the detection target object 100 has moved from right to left (S16). The optical sensor 101 determines the movement direction of a detection target object 100 in a similar manner in a case where the detection target object 100 has moved in the opposite direction. In a case where ME_FLG is set to X− at the first determination (S13), Ratio_X is expected to satisfy Ratio_X≥Ratio_th (S4). It is only in a case where Ratio_X satisfies the above condition that the optical sensor 101 determines that the detection target object 100 has moved from left to right (S6). The optical sensor 101 can further perform a similar determination for Ratio_Y so as to simultaneously determine the movement direction of the detection target object 100 with respect to the Y direction. After an end of the determination, the optical sensor 101 clears all FLGs so as to be ready for a subsequent determination of a movement direction (S7).

The determination procedure described here may be arranged such that the process takes the "YES" route at the above steps S4, S14, S9, and S12 (to move to S5, S15, S10, and S13, respectively) regardless of the sign of the output Ratio_X, that is, if |Ratio_X|≥Ratio_th (positive).

<Working Effect of Optical Sensor>

With the above arrangement, the movement direction determination section 73 determines the movement direction of a detection target object 100 with use of the ratio Ratio_X of the difference between the photocurrents to the sum of the photocurrents, specifically, by setting a given threshold value Ratio_th for Ratio_X and comparing the two values.

The sum of the photocurrents changes over time in correlation with how the amount of light received by the light receiving element DPD changes with a change (for example, an error in the amount of light received which error is caused by a change in the distance or angle of the human hand) in a relative positional relationship between the light receiving element DPD and the detection target object 100 [see (a) of FIG. 5]. The difference between the photocurrents varies in amplitude depending on whether the detection target object 100 moves past the optical sensor 101 at a short distance or a long distance [see (b) of FIG. 5].

That means that dividing the difference between the photocurrents by the sum of the photocurrents can eliminate, from the amplitude of each photocurrent detected, an influence of a change in the amount of light received which change is caused by a change in the relative positional relationship between the light receiving element DPD and a detection target object 100 (for example, the distance or angle of the human hand).

Even in a case where a production tolerance of the light receiving elements PD1 to PD4 included in the light receiving element DPD has caused a variation in the light sensitivity among the light receiving elements PD1 to PD4, such a variation is reduced because the optical sensor 101 determines the movement direction of a detection target object 100 on the basis of Ratio_X above. For the sum and difference of the photocurrents, the S/N ratio may suffer from a decrease as a result of disturbance such as noise. The optical sensor 101, however, determines the movement direction of a detection target object 100 on the basis of Ratio_X above. This cancels out an influence of the disturbance. With this arrangement, the optical sensor 101 can accurately detect a movement of a detection target object 100 regardless of a change in a relative positional relationship between the light receiving element DPD and the detection target object 100.

Embodiment 2

Figure 7:
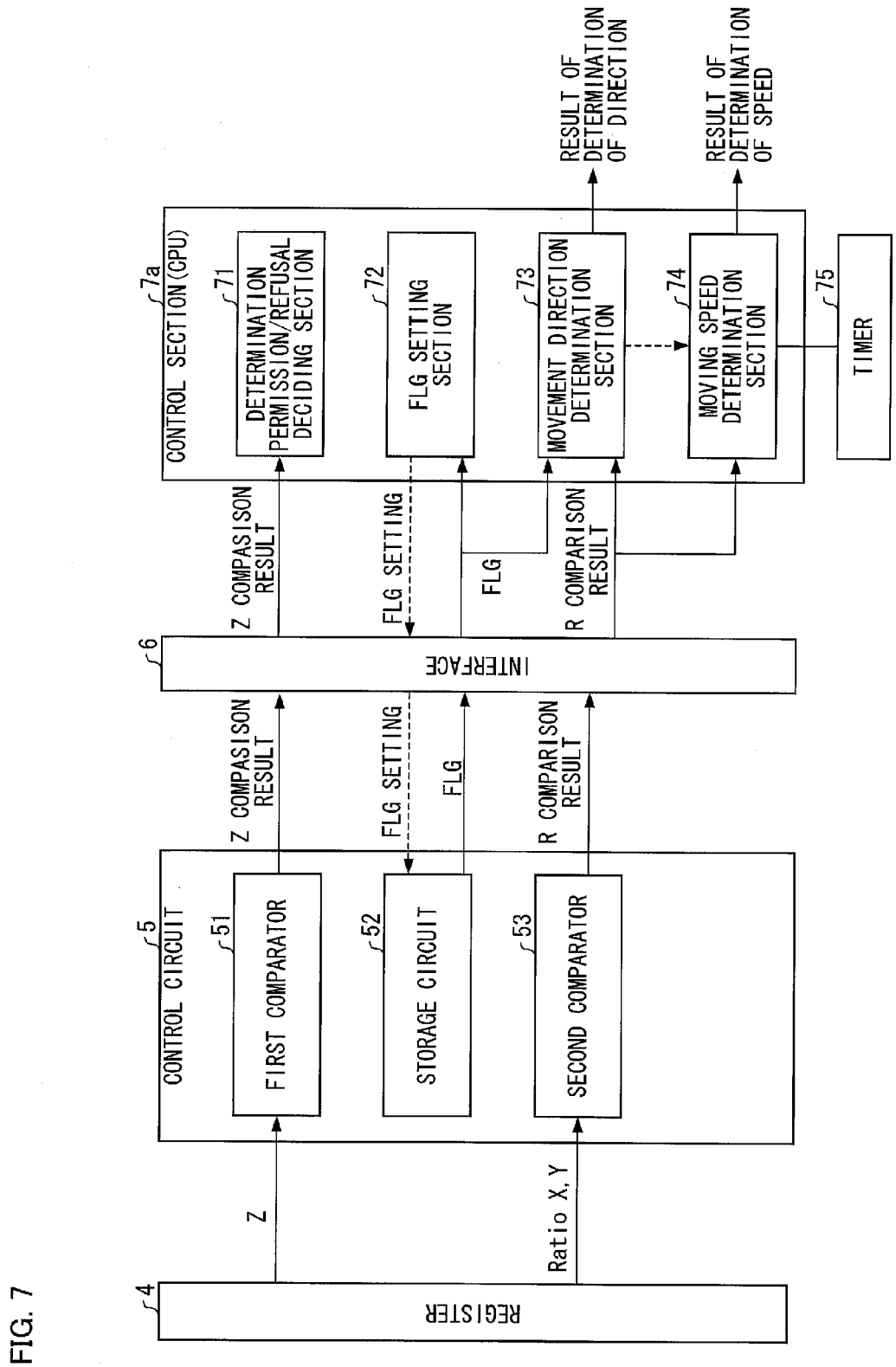
FIG. 7 is a block diagram illustrating a configuration of a main part of the optical sensor of Embodiment 2 of the present invention.

The following descriptions discuss Embodiment 2 of the present invention with reference to FIG. 7. The present embodiment is an optical sensor that differs from the optical sensor 101 of Embodiment 1 above only in that the optical sensor of the present embodiment includes a control section 7a and a timer 75 instead of the control section 7 of Embodiment 1. Since the members other than the control section 7a of the optical sensor of the present embodiment are as described above for Embodiment 1, the descriptions below do not deal with such other members. The control section 7a differs from the control section 7 in that the control section 7a includes a moving speed determination section (moving speed specifying means) 74. Since the members other than the moving speed determination section 74 of the control section 7a are as described above for Embodiment 1, the descriptions below do not deal with such other members.

<Determination of Moving Speed>

The moving speed determination section 74 may specify the moving speed of a detection target object 100 on the basis of, for example, the length of a period over which the sign of Ratio_X becomes reversed (see the time interval t1-t2 in (c) of FIG. 5 or the time interval t1'-t2' in (d) of FIG. 5).

The optical sensor of the present embodiment can determine the moving speed of a detection target object by, for instance, (i) causing the moving speed determination section 74 to activate the timer 75 when the optical sensor determines for the first time whether Ratio_X≥Ratio_th or whether Ratio_X≤−Ratio_th (S10, S13) and then (ii) causing the timer 75 to measure a time period required for the optical sensor to determine whether the movement direction is right or left (S6, S16). The moving speed determination section 74 can thus determine the moving speed. In a case where the optical sensor obtains, from the control section 7a via the interface 6, data created by the light emitting and receiving unit 90, it means that the optical sensor has a certain sampling rate. The above determination of a moving speed is equivalent to determining a moving speed on the basis of how many signals after Ratio_X exceeds a threshold value for the first time have been sampled for determination of a movement direction.

Embodiment 3

The following descriptions discuss Embodiment 3 of the present invention with reference to (b) of FIG. 2. (b) of FIG. 2 illustrates a mode in which the present invention is applied to a transmissive light emitting and receiving unit (light emitting and receiving unit 90A). The reflective light emitting and receiving unit included in the optical sensor of Embodiment 1 or 2 above may be replaced with a transmissive light emitting and receiving unit as in the present embodiment.

In a case where an optical sensor includes the transmissive light emitting and receiving unit 90A of the present embodiment, the sum of the photocurrents changes over time in correlation to how the amount of light received by the light receiving element DPD changes with such a change as in the angle of the human hand among changes in the relative positional relationship between the light receiving element DPD and the detection target object 100 (for example, a human hand).

That means that dividing the difference between the photocurrents by the sum of the photocurrents can eliminate, from the amplitude of each photocurrent detected, an influence of a change in the amount of light received which change is caused by a change in the relative positional relationship between the light receiving element DPD and the detection target object 100.

Even in a case where the production tolerance of the light receiving elements PD1 to PD4 included in the light receiving element DPD has caused a variation in the light sensitivity among the light receiving elements PD1 to PD4, such a variation is reduced because the optical sensor 101 determines the movement direction of the detection target object 100 on the basis of Ratio_X above. For the sum and difference of the photocurrents, the S/N ratio may suffer from a decrease as a result of disturbance such as noise. The optical sensor 101, however, determines the movement direction of a detection target object 100 on the basis of Ratio_X above. This cancels out an influence of the disturbance.

With this arrangement, the optical sensor 101 can accurately detect the movement of the detection target object 100 regardless of a change in a relative positional relationship between the light receiving element DPD and the detection target object 100 such as a change as in the angle of the human hand. Additionally, the light emitting and receiving unit 90A of the present embodiment achieves advantages of a transmissive optical sensor: The optical sensor of the present embodiment has a long detection distance and a high detection accuracy. The optical sensor can detect any opaque detection target object 100 regardless of its shape, color, or material. Further, the lens does not easily become dirty or attract dust.

Embodiment 4

Figure 8:
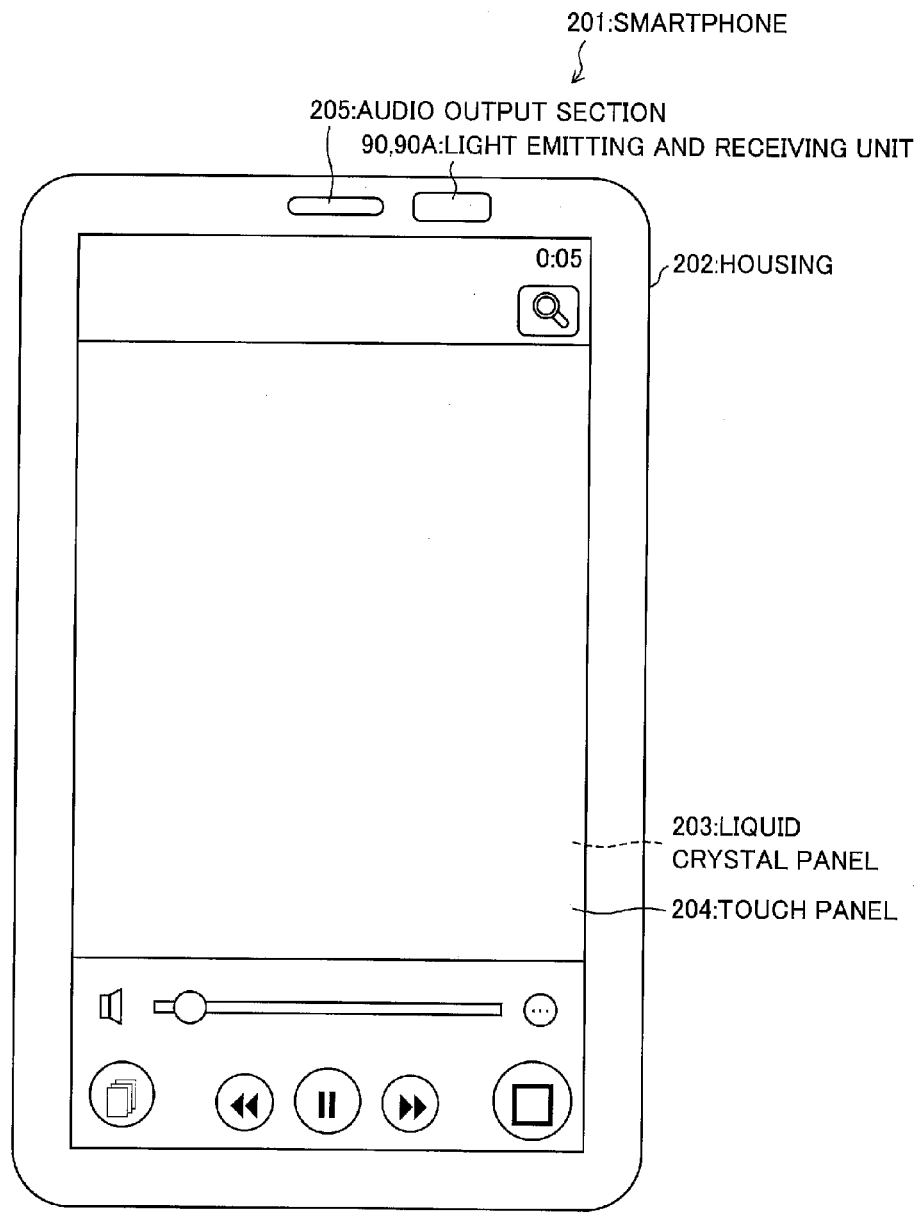
FIG. 8 is a front view of a smartphone of Embodiment 4 of the present invention, the view illustrating an appearance of the smartphone.
Figure 9:
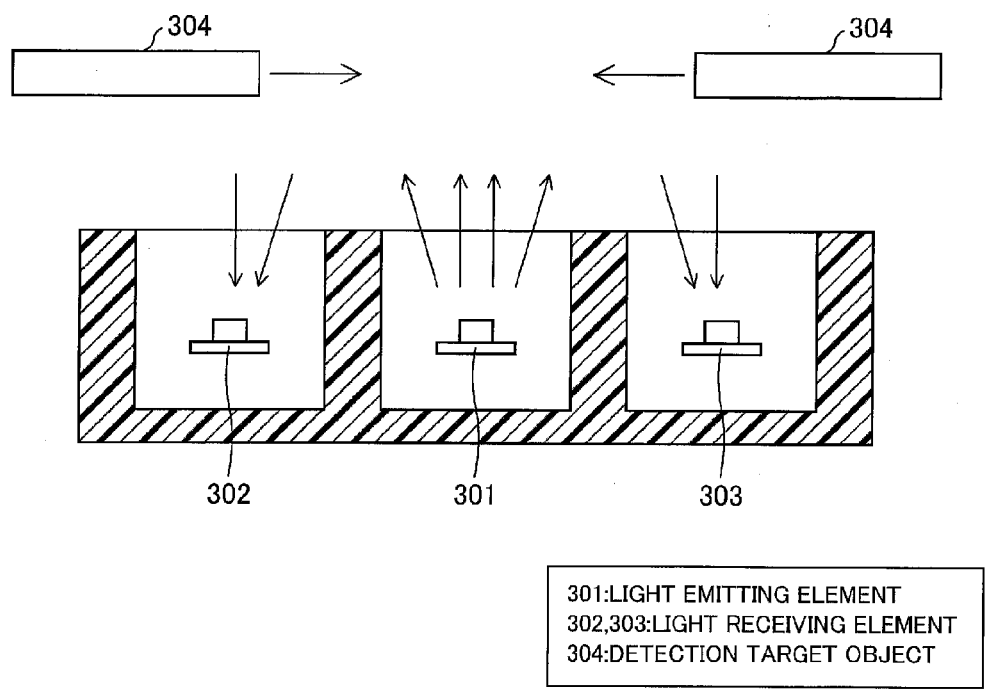
FIG. 9 is a longitudinal sectional view of a conventional gesture sensor, the illustrating a configuration of the gesture sensor.

The following descriptions discuss Embodiment 4 of the present invention with reference to FIG. 8. The present embodiment is a smartphone (electronic device) 201, which may include any of the respective light emitting and receiving units included in Embodiments 1 to 3 above. FIG. 8 is a plan view of the smartphone 201 of Embodiment 4 of the present invention, the view illustrating a configuration of the smartphone 201.

As illustrated in FIG. 8, the smartphone 201 as an electronic device of the present invention includes a housing 202, a liquid crystal panel 203, and a touch panel 204 the liquid crystal panel 203 and the touch panel 204 being integrated with the housing 202. The smartphone 201 is configured such that (i) the liquid crystal panel 203 is located on a side of the housing 202 on which side an operation surface is present and that (ii) the touch panel 204 is superjacent to the liquid crystal panel 203.

The smartphone 201 further includes an audio output section 205 and a light emitting and receiving unit 90 or 90A at an upper portion of the operation surface of the housing 202. The audio output section 205 serves to output, for example, (i) voices during use of the smartphone 201 as a telephone and (ii) various sounds corresponding to different operations of application programs.

The light emitting and receiving unit 90 or 90A is a light-receiving section for detecting, for example, an approach of a detection target object 100 (for example, a user's face) and a gesture operation.

The smartphone 201 of the present embodiment is an electronic device including the light emitting and receiving unit 90 or 90A, which can detect a movement of a detection target object 100 accurately regardless of the distance between the detection target object 100 and the light emitting and receiving unit 90 or 90A.

[Software Implementation Example]

A control block of the optical sensor 101 (each control block of particularly, the control circuit 5, and the control sections 7 and 7a) may be realized by a logic circuit (hardware) provided in an integrated circuit (IC chip) or the like or may be realized by software as executed by a CPU (Central Processing Unit).

In the latter case, the optical sensor 101 includes: a CPU that executes instructions of a program that is software realizing the foregoing functions; read only memory (ROM) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Conclusion]

The optical sensor (101) of aspect 1 of the present invention includes a plurality of light receiving elements (PD1 to PD4) each for generating a photocurrent in response to receipt of (i) reflected light resulting from a detection target object (100) reflecting light having been emitted by a light emitting element (LED) to the detection target object (100) or (ii) ambient light not having been blocked by the detection target object (100); a first comparison section (a second comparator 53) for comparing, with a predetermined threshold value (Ratio_th and the like), an absolute value of a ratio (Ratio_X and the like) of (i) a difference between the respective photocurrents of at least two of the plurality of light receiving elements which at least two light receiving elements are arranged in a particular direction to (ii) a sum of the respective photocurrents of the at least two light receiving elements; and a movement direction determination section (the movement direction determination section 73) for, in a case where the first comparison section has determined that the absolute value of the ratio is larger than the predetermined threshold value, determining that the particular direction is a direction in which the detection target object (100) is moving.

With the above arrangement, the movement direction determination section determines the movement direction of a detection target object with use of the ratio of the difference between the photocurrents to the sum of the photocurrents, specifically, by setting a given threshold value for the ratio and comparing the two values.

The sum of the photocurrents changes over time in correlation with how the amount of light received by the light receiving element changes with a change (for example, an error in the amount of light received which error is caused by a change in the distance or angle of the human hand) in a relative positional relationship between the optical sensor and the detection target object [see (a) of FIG. 5]. The difference between the photocurrents varies in amplitude depending on whether the detection target object moves past the optical sensor at a short distance or a long distance [see (b) of FIG. 5].

That means that dividing the difference between the photocurrents by the sum of the photocurrents can eliminate, from the amplitude of each photocurrent detected, an influence of a change in the amount of light received which change is caused by a change in the relative positional relationship between the optical sensor and a detection target object.

Even in a case where a production tolerance of the light receiving elements has caused a variation in the light sensitivity among the light receiving elements, such a variation is reduced because the optical sensor determines the movement direction of a detection target object on the basis of the ratio above. An optical sensor may suffer from a decrease in the S/N ratio as a result of disturbance such as noise. The optical sensor, in contrast, determines the movement direction of a detection target object on the basis of the ratio above of the difference between the photocurrents to the sum of the photocurrents. This cancels out an influence of the disturbance.

With this arrangement, the optical sensor can accurately detect a movement of a detection target object regardless of a change in a relative positional relationship between the optical sensor and the detection target object.

Further, an optical sensor of aspect 2 of the present invention is arranged as in aspect 1, and further includes: a second comparison section for comparing the sum with a predetermined current value, wherein in a case where the second comparison section has determined that the sum is smaller than the predetermined current value, the movement direction determination section does not determine the direction in which the detection target object is moving.

As described above, the variation in the light sensitivity is reduced because the optical sensor determines the movement direction of the detection target object on the basis of the ratio. This cancels out an influence of the disturbance. A larger sum of the photocurrents increases such effects as the effect of reducing variation and the effect of cancelling out disturbance. Thus, the above arrangement can reduce, for example, (i) an error in an amount of light received by the light receiving element which error arises from a tolerance in production of the light receiving element and/from an angle of a human hand as a detection target object and (ii) an influence of disturbance so that the movement direction determination section 73 can more accurately determine the direction in which a detection target object is moving.

An optical sensor of aspect 3 of the present invention is arranged as in aspect 1 or 2, and is further arranged such that the ratio has either a positive sign or a negative sign; and in a case where the first comparison section has determined that (i) the absolute value of the ratio having a first sign is larger than the threshold value having a positive sign and has then determined that (ii) the absolute value of the ratio having a second sign opposite to the first sign is larger than the threshold value having the positive sign, the movement direction determination section determines the direction in which the detection target object is moving.

With the above arrangement, (i) the absolute value of the ratio and the positive threshold value are compared with each other at least twice by the time the sign of the ratio is reversed, and (ii) the movement direction determination section determines the movement direction of a detection target object on the basis of respective results of the comparisons. This arrangement allows the movement direction determination section to determine the movement direction of a detection target object more accurately than determining the movement direction of a detection target object on the basis of a result of only one of such two comparisons.

An optical sensor of aspect 4 of the present invention is arranged as in aspect 3, and further includes a moving speed specifying section for, on a basis of a length of a time period over which the sign of the ratio is reversed, specifying a speed at which the detection target object is moving.

The above arrangement allows an accurate determination of the moving speed of a detection target object with use of a simple configuration.

Further, an electronic device of aspect 5 of the present invention includes an optical sensor of any one of aspects 1 to 4.

The above configuration can provide an electronic device that can accurately detect a movement of a detection target object regardless of a change in a relative positional relationship between the detection target object and the optical sensor.

The optical sensor according to the foregoing embodiments of the present invention may be realized by a computer. In this case, the present invention encompasses: a control program for the optical sensor which program causes a computer to operate as the foregoing means of the optical sensor so that the optical sensor can be realized by the computer; and a computer-readable storage medium storing the control program therein.

[Supplementary Note]

The present invention is not limited to the description of the embodiments above, but may be altered by a skilled person within the scope of the claims. Any embodiment based on a proper combination of technical means disclosed in different embodiments is encompassed in the technical scope of the present invention. Furthermore, the technical means disclosed in different embodiments can be combined to form a new technical feature.

INDUSTRIAL APPLICABILITY

The present invention can be suitably used for (i) a proximity sensor including a reflective optical sensor or transmissive optical sensor and (ii) a gesture sensor used to detect a movement of an object.

REFERENCE SIGNS LIST

51 First comparator (second comparison section)
53 Second comparator (first comparison section)
73 Movement direction determination section (movement direction determination means)
74 Moving speed determination section (moving speed specifying means)
100 Detection target object
101 Optical sensor
201 Smartphone (electronic device)
PD1 to PD4 Light receiving element
DPD Light receiving element
LED Light emitting element

The invention claimed is:

1. An optical sensor, comprising:
a plurality of light receiving elements each for generating a photocurrent in response to receipt of (i) reflected light resulting from a detection target object reflecting light having been emitted by a light emitting element to the detection target object or (ii) ambient light not having been blocked by the detection target object;
a first comparison section for comparing, with a predetermined threshold value, an absolute value of a ratio of (i) a difference between the respective photocurrents of at least two of the plurality of light receiving elements which at least two light receiving elements are arranged in a particular direction to (ii) a sum of the respective photocurrents of the at least two light receiving elements; and
a movement direction determination section for, in a case where the first comparison section has determined that the absolute value of the ratio is larger than the predetermined threshold value, determining that the particular direction is a direction in which the detection target object is moving.

2. The optical sensor according to claim 1, further comprising:
a second comparison section for comparing the sum with a predetermined current value,
wherein in a case where the second comparison section has determined that the sum is smaller than the predetermined current value, the movement direction determination section does not determine the direction in which the detection target object is moving.

3. The optical sensor according to claim 1,
wherein:
the ratio has either a positive sign or a negative sign; and
in a case where the first comparison section has determined that (i) the absolute value of the ratio having a first sign is larger than the threshold value having a positive sign and has then determined that (ii) the absolute value of the ratio having a second sign opposite to the first sign is larger than the threshold value having the positive sign, the movement direction determination section determines the direction in which the detection target object is moving.

4. The optical sensor according to claim 3, further comprising:
a moving speed specifying section for, on a basis of a length of a time period over which the sign of the ratio is reversed, specifying a speed at which the detection target object is moving.

5. An electronic device, comprising an optical sensor according to claim 1.

* * * * *